United States Patent [19]

Thomas et al.

[11] Patent Number: 4,784,167

[45] Date of Patent: Nov. 15, 1988

[54] APPARATUS FOR THE CARE OF CONTACT LENSES

[75] Inventors: Peter Thomas, Wuppertal; Hans-Joachim Reitz, Roesrath; Udo Schaab, Korschenbroich; Klaus-Dieter Wisotzki, Erkrath, all of Fed. Rep. of Germany

[73] Assignee: Henkel Kommanditgesellschaft auf Aktien, Duesseldorf, Fed. Rep. of Germany

[21] Appl. No.: 69,672

[22] Filed: Jul. 6, 1987

[30] Foreign Application Priority Data

Nov. 15, 1986 [DE] Fed. Rep. of Germany ....... 3639099

[51] Int. Cl.$^4$ .............................................. B08B 3/10
[52] U.S. Cl. ..................................... 134/93; 134/199; 134/184
[58] Field of Search ................. 134/93, 137, 138, 139, 134/199; 366/127; 137/268; 206/5, 5.1; 422/292, 297, 300; 68/355

[56] References Cited

U.S. PATENT DOCUMENTS

| | | | |
|---|---|---|---|
| 3,009,468 | 11/1961 | Eberle | 134/93 |
| 3,041,212 | 6/1962 | Booth | 134/138 X |
| 3,158,160 | 11/1964 | Estandian | 134/93 |
| 3,623,492 | 11/1971 | Frantz et al. | 134/143 |
| 3,860,394 | 1/1975 | Tepas, Jr. et al. | 134/93 X |
| 3,871,395 | 3/1975 | Murry | 134/184 X |
| 4,700,729 | 10/1987 | Thaler | 134/139 |

FOREIGN PATENT DOCUMENTS 3410400  9/1985  Fed. Rep. of Germany .

Primary Examiner—Harvey C. Hornsby
Assistant Examiner—Frankie L. Stinson
Attorney, Agent, or Firm—Ernest G. Szoke; Henry E. Millson, Jr.; Real J. Grandmaison

[57] ABSTRACT

Apparatus for the care of contact lenses is disclosed. The apparatus includes a container for a treatment liquid, a contact lens holder which fits into the container, and nozzles positioned in the container for spraying treatment liquid onto contact lenses supported by the contact lens holder and for agitating the treatment liquid.

14 Claims, 2 Drawing Sheets

APPARATUS FOR THE CARE OF CONTACT LENSES

BACKGROUND OF THE INVENTION

1. Field of the Invention

This invention relates to apparatus for the care of contact lenses including a contact lens holder immersible in a container of treatment liquid and having means for agitating the treatment liquid.

2. Description of Related Art

In known devices of this type (German Patent Publication No. OS 34 10 400 and U.S. Pat. No. 3,623,492), the treatment liquid is agitated by rotation of the contact lens holder, rotation being effected manually by means of a rotatably mounted cover and gearing between the cover and the contact lens holder. In this arrangement agitation or stirring of the treatment liquid is relatively limited and, for this reason, so is the washing of the contact lenses and the dissolution of any tablets or powders in the treatment liquid. Manual operation has proved unsatisfactory in practice.

Accordingly, it has been proposed in copending application Ser. No. 069,794 filed on July 7, 1987 by Thomas, which is herein incorporated by reference to agitate the treatment liquid using a cylindrical stirrer which surrounds the contact lens holder in the container for the treatment liquid—the contact lens holder and the stirrer in this case being arranged in a multiple-part housing with an electric motor and gearing for driving the stirrer in one part of the housing and a battery for powering the motor being arranged in another part of the housing.

BRIEF DESCRIPTION OF THE DRAWINGS

The invention is hereinafter described in detail with reference to the accompanying drawings, wherein.

DESCRIPTION OF THE INVENTION

Figure 1:
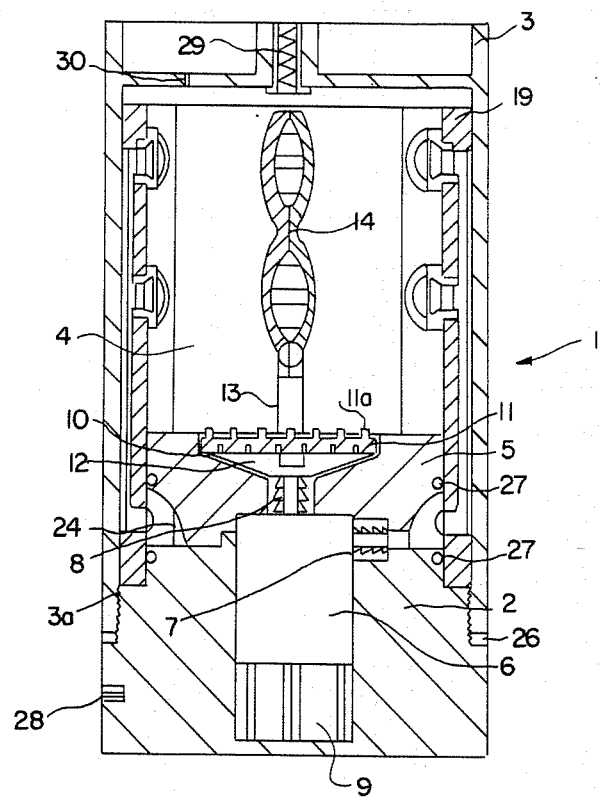
FIG. 1 is a vertical sectional view through apparatus according to the invention.

An object of the present invention is to provide a device which, similar to the device of application, Ser. No. 069,794 mentioned above, is more easy to use and accelerates and improves the quality of cleaning for contact lenses relative to prior art arrangements. The present device is particularly simple and compact in design and, hence, inexpensive to manufacture. The device also accelerates the dissolution of tablets introduced into the treatment liquid, particularly the so-called two-component tablets.

This and other objects are achieved in accordance with the present invention by an apparatus for the care of contact lenses having a container for treatment liquid, a contact lens holder which fits into the container, nozzle means positioned in the container for spraying treatment liquid onto contact lenses supported by the contact lens holder and means for pumping treatment liquid from the container through the nozzle means. Treatment liquid in the container preferably is circulated by a motor-driven pump and is sprayed through the nozzles.

With this arrangement, treatment liquid in the container is constantly recirculated so that tablets or powder introduced into the treatment liquid are quickly and uniformly dissolved. Furthermore, since treatment liquid is applied very intensively and directly onto the surfaces of contact lenses supported in the container a correspondingly improved cleaning, sterilizing or disinfecting and neutralizing effect is obtained.

In the illustrated preferred embodiment, a motor-actuated pump is located in the lower part of a housing while the container of treatment liquid is positioned in the upper part of the housing.

Also in the illustrated embodiment, a treatment tablet support is provided in the preferably funnel-shaped suction zone of the pump. With this arrangement, the treatment tablet is dissolved particularly quickly due to the flow of liquid into the pump. The tablet support preferably comprises a perforated or porous plate or screen provided with projections which prevents relatively large pieces of the dissolving or disintegrating tablets from entering the pump, while ensuring that treatment liquid flows around all sides of the tablets.

In an alternate embodiment, the contact lens holder is bifurcated at the base and is situated above an upwardly directed intake nozzle of the pump. The tablet support is positioned between the two bifurcated arms of the contact lens holder which are inserted into recesses in the lower part of the housing.

If desired, heating elements also may be positioned in the flow path of the treatment liquid, preferably in the funnel-like suction zone of the pump beneath the tablet support and above the pump.

In another particularly advantageous embodiment of the invention, nozzles are arranged on upright arms of a nozzle carrier having a ring-like structure at its lower end. The outside surface of the upright arms have channel-like grooves which, in conjunction with the inner wall of the container, define inlet flow passages to the nozzles. The channel-like grooves each have a bore at their lower ends directed radially inwardly. The bores lead to an encircling flow passage which is in flow communication with a lateral outlet port of the pump. The encircling passage may be formed between the lower ring-like port of the nozzle carrier and the base of the lower part of the housing. The nozzles are arranged in a manner which guarantees that contact lenses supported by the lens holder are sprayed from all directions. Either or both the contact lens holder and the nozzle carrier may be journaled for rotatable motion in order to further improve the cleaning effect.

Manufacture and use of the apparatus is further simplified if the lower part of the housing having the pump/motor unit and the upper part of the housing forming the container are releasably interconnected, preferably by means of a threaded joint.

A safety valve for releasing excessive internal pressure and a filling valve for the introducing treatment liquid, for example, from an aerosol can, may be provided in the housing.

With reference to the drawings, the apparatus comprises a cylindrical housing 1 with a pedestal-like lower part 2 and an upper part 3 designed to be screwed together at threaded connection 3a, and sealed by ring seal 26. The upper part 3 of the housing forms the side walls of container 4 for treatment liquid, while the base of container 4 is formed by the top surface of pedestal-like lower part 2 of housing 1. A pump 6 is positioned in a recess in pedestal-like lower part 2 of housing 1 beneath an upper base 5. Pump 6 has a lateral outlet or discharge port 7 and an upwardly directed inlet or intake port 8. Preferably either or both the inlet and outlet ports have resistive heating elements on their inner surfaces. Pump 6 is actuated by an electric motor 9.

Upper base 5 which is located above the intake port 8, has a surface which slopes inwardly and downwardly to port 8 to provide an inlet funnel 10. A tablet support in the form of a perforated or porous plate or screen 11 is positioned above the inlet funnel 10. Screen 11 is provided with a plurality of spaced, upward projections 11a for supporting a tablet off the surface of the screen. The surface of upper base 5 is provided with recesses 12 on opposite sides of inlet funnel 10 into which the lower ends of bifurcated arms 13 of contact lens holder 14 fit.

Contact lens holder 14 typically comprises the combination of cups 15 for accommodating two contact lenses (not shown) with an associated lid 17 pivotal about a hinge 16. Both the cups 15 and the lid 17 are provided with large openings to allow free access of liquid to the lenses. Lid 17 is held closed relative to cups 15 by means of cooperating latch elements 18 on lid 17 and holder 14.

Figure 2:
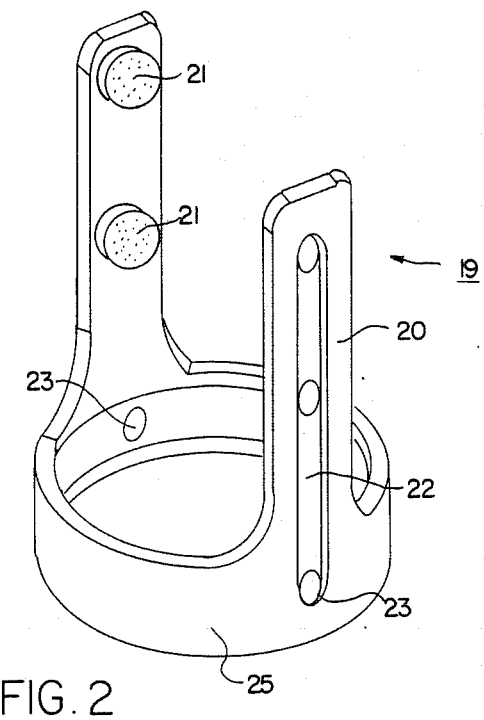
FIG. 2 is a perspective view of the nozzle carrier per se of the apparatus shown in FIG. 1.
Figure 3:
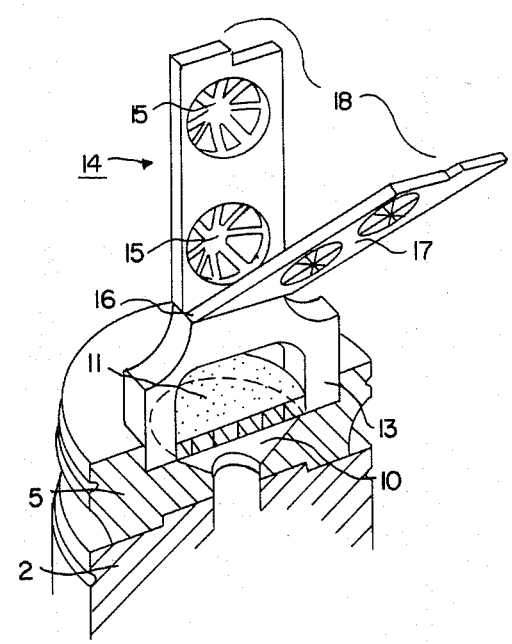
FIG. 3 is a fragmentary perspective view partly in section of the pump inlet of FIG. 1 with a contact lens holder fitted thereabove.

Nozzle carrier 19, shown most clearly in FIG. 2, comprises a lower ring 25 and two diametrically opposed upright arms 20. Nozzle carrier 19 is positioned between lower part 2 and upper part 3 of housing 1. Nozzles 21 are spaced along the two upright arms 20 of nozzle carrier 19 and are aimed at the contact lenses in holder 14. The sides of the upright arms opposite to nozzles 21 hav channel-like grooves 22 which, in conjunction with the inner side wall of the container in upper part 3 of housing 1 define inlet flow passages to nozzles 21. The channel-like grooves 22 each have a bore 23 at their lower ends directed radially inwardly to an encircling flow passage 24 formed between ring 25 of nozzle carrier 19 and the housing. Flow passage 24 communicates with outlet port 6 of pump 6. As needed, O-ring seals 27 are provided between both lower part 2 and upper base 5 of housing 1 and nozzle carrier 19.

An electrical connection 28 for supplying power to motor 9 is provided in the lower part of the housing, while a filling valve 29 for introducing treatment liquid into container 4, for example, from an aerosol can, and a liquid-tight relief or safety valve 30 for releasing excess pressure in container 4 are arranged in the upper part of the housing.

The described device operates as follows:

After upper part 3 of housing 1 has been unscrewed, lid 17 of contact lens holder 14 is opened, the contact lenses are placed in cups 15 and lid 17 is closed. Upper part 3 of housing 1 is inverted and treatment liquid is introduced into container 4 up to a predetermined level. After a tablet optionally has been positioned between arms 13 of contact lens holder 14 and tablet support 11, the lower part of housing 1 is screwed on upper part 3. The housing is returned back through 180° to its upright position and motor 9 is activated. Alternatively, container 4 of the assembled housing may be filled with treatment liquid through filling valve 29 in which case there is, of course, no need to invert the device.

The contact lens treatment cycle time of the apparatus depends on the nature of the treatment. It is possible to use two separate treatment liquids in a staged procedure, initially charging the container with cleaning and sterilizing liquid in the first treatment stage followed by emptying the container of liquid and refilling it with neutralizing solution for the second stage. In both treatment stages liquid in container 4 is sprayed onto the supported contact lenses through nozzles 21. All the constituents required for sterilizing and cleaning the lenses and for subsequently neutralizing the first treatment solution also may be introduced at the outset. For example, by the judicious selection of suitable tablets or powders, as described in copending application Ser. No. 069,794, a sterilizing and cleaning solution first is formed which is followed, after an appropriate time, by the formulation of a neutralizing solution. A sterilizing and cleaning solution may be introduced into container 4 as a liquid, while the neutralizing compound is introduced in tablet form for delayed dissolution. Finally, a so-called two-component treatment tablet may be employed wherein components which form a sterilizing and cleaning solution initially dissolve, followed after a certain time period by the dissolution of the components which form the neutralizing solution. When using tablets, they are positioned on tablet support 11 and the treatment liquid, which may be a solution of sodium chloride or water, optionally distilled water, is introduced into the container.

Although certain embodiments of the invention have been described in detail, the described device may of course be modified or extended in many ways without departing from the concept of the invention. As mentioned previously, heating elements may advantageously be positioned in the vicinity of the inlet funnel of the pump, for heating the recirculating liquid. The heating elements may be activated simultaneously with or separately from the drive motor. Also a time controller for either or both the pump and heating elements may be placed in pedestal-like lower part 2 of housing 1. The apparatus can easily be adapted for use in combination with a so-called battery cup into which pedestal-like lower part 2 of housing 1 fits, thereby automatically establishing a power connection to pump 6 and any optional heating elements. As recognized by those skilled in the art, the battery cup also can include a transformer for connecting the apparatus to a standard AC power source. Nozzle 21 also may be designed so that the liquid jets emerge from each nozzle at any desired angle in relation to the horizontal center line of the nozzle, thus for example, causing the jet to impinge tangentially on the contact lenses. By appropriately adjusting the nozzles, the effect of the liquid jets on the agitation of the liquid treatment can be optimized. In any event, the scope of the invention is defined in the appended claims.

We claim:

1. Apparatus for the care of contact lenses comprising a container for treatment liquid, a contact lens holder which fits into the container, nozzle means positioned in said container for spraying treatment liquid onto contact lenses supported by the contact lens holder, means for pumping treatment liquid from said container through said nozzle means, and a nozzle carrier for insertion into said container comprising a ring at one end and upright arms extending from said ring, said nozzle means being positioned on said upright arms to discharge into said container, said upright arms having channel-like grooves along their length which in conjunction with an inner side wall of the container form flow conduits which communicate with the nozzles, said ring having bores which are directed radially inwardly in communication with a flow passage means which connects said bores with an output of said pump.

2. An apparatus in accordance with claim 1 wherein said means for pumping treatment liquid through said nozzle means comprises a motor-driven pump.

3. An apparatus in accordance with claim 2 wherein the apparatus includes a housing, said pump being positioned in a lower part of said housing and the container for the treatment liquid being positioned in an upper part of said housing.

4. An apparatus in accordance with claim 3 having a treatment tablet support positioned above an inlet port of said pump.

5. An apparatus in accordance with claim 4 wherein said contact lens holder is bifurcated at its base to provide two spaced arms insertable into recesses in the lower part of the housing for supporting said contact lens holder above an upwardly directed inlet port of said pump, said treatment tablet support being positioned between the two arms of said contact lens holder.

6. An apparatus in accordance with claim 5 wherein the treatment tablet support is perforated and has a plurality of spaced, upward projections on the tablet engaging surface.

7. An apparatus in accordance with claim 3 wherein the upper and lower part of said housing are releasably interconnected.

8. An apparatus in accordance with claim 7 wherein the upper and lower part of said housing are releasably interconnected by a threaded joint.

9. An apparatus in accordance with claim 3 having a safety valve in the upper part of said housing for releasing excess pressure from said container.

10. An apparatus in accordance with claim 3 having a filling valve in the upper part of the housing for introducing treatment liquid into the container under pressure.

11. An apparatus in accordance with claim 1 further comprising heating elements for heating the treatment liquid.

12. An apparatus in accordance with claim 11 wherein said heating elements are positioned between the inlet port of the pump and the treatment tablet support.

13. An apparatus in accordance with claim 1 wherein the apparatus includes a housing an upper part defining said side wall of the container and a lower part having a base defining a bottom wall of the container, said passage means being formed between the ring of said nozzle carrier and said base at the lower part of said housing.

14. An apparatus in accordance with claim 1 wherein said contact lens holder and said nozzle means are rotatable with respect to one another.

* * * * *